3,041,348
CARBAZOLE AMINES
Chester S. Sheppard, Edgewood, and Myron H. Wilt, Monroeville, Pa., assignors to United States Steel Corporation, a corporation of New Jersey
No Drawing. Filed Sept. 14, 1960, Ser. No. 55,842
3 Claims. (Cl. 260—315)

This invention relates to amino derivatives of carbazole which are useful as non-volatile anti-oxidants in rubber compounding, and a method for making such derivatives.

Generally speaking, the method of our invention comprises refluxing 3-aminocarbazole or 3,6-diaminocarbazole with cyclohexanone in toluene, removing the water of reaction and subjecting the resulting intermediate Schiff bases to catalytic hydrogenation. This produces the desired derivatives, 3-(N-cyclohexylamino)carbazole (I) or 3,6-di-(N-cyclohexylamino)carbazole (II).

A complete understanding of the invention may be obtained from the following detailed explanation of a few typical examples of its practice.

Example 1

A solution of 28.0 grams of 3-aminocarbazole and 77.0 ml. of cyclohexanone in 500 ml. of toluene was refluxed over a Dean-Stark apparatus for removing the water of reaction. After the theoretical amount of water was removed, the solution was cooled to $-5°$ C. and filtered. The resulting crystals were then washed with petroleum ether and dried. They amounted to 33.5 grams (83.2% yield) of 3-(N-cyclohexylideneamino)carbazole (III), melting point 155–158° C. The infrared spectrum is in accord with its structure, showing bands for C=N, N—H, $CH_2$, and aromatic CH.

*Analysis.*—Calculated for $C_{18}H_{18}N_2$: N, 10.70. Found: N, 10.98.

The equation for the reaction is shown below:

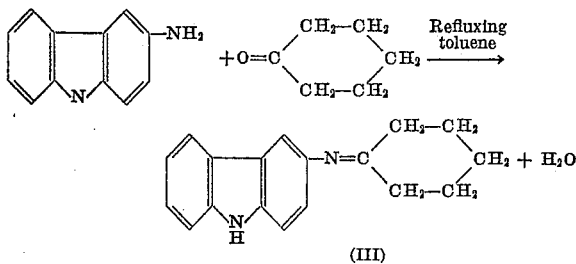

A suspension of 26.4 grams (0.10 mole) of III and 3 grams of 5% platinum on powdered alumina catalyst in 200 ml. of 95% ethanol, was hydrogenated in a Parr hydrogenator at 60° C. under an initial pressure of 60 pounds of hydrogen. After a few minutes, the theoretical amount of hydrogen was absorbed and 50 ml. of aqueous 10% hydrochloric acid was added. The catalyst was filtered off. The filtrate was made basic with 10% aqueous sodium hydroxide and filtered. The solid product was washed with water and dried. It amounted to an 87.2% yield of 3-(N-cyclohexylamino)carbazole (I), melting point, 216–218° C. After recrystallization, the melting point was 217.5 to 219° C.

*Analysis.*—Calculated for $C_{18}H_{20}N_2$: C, 81.78; H, 7.63; N, 10.60. Found: C, 81.55; H, 8.15; N, 10.91. The infrared spectrum is in accord with the structure, showing the disappearance of the C=N band and the presence of the N—H, $CH_2$, and aromatic CH bands.

The equation for the reaction is shown below:

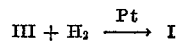

Example 2

A solution of 7.0 grams of 3,6-diaminocarbazole and 20 ml. of cyclohexanone in 250 ml. of toluene was refluxed over a Dean-Stark water trap. After the theoretical amount of water was removed, the hot solution was filtered into a Parr flask containing 3 grams of 5% platinum on powdered alumina catalyst. The mixture was subjected to hydrogen for one hour at 60 p.s.i., filtered hot, and cooled. The resulting crystals were filtered, washed with petroleum ether, and dried. They amounted to 7.8 grams (61.3% yield) of 3,6-di-(N-cyclohexylamino)carbozole (II). This product becomes liquid at 255° C. Its hydrochloride salt melts at 275° C. with decomposition.

*Analysis.*—Calculated for $C_{24}H_{31}N_3$: N, 11.60. Found: N, 11.12. The infrared spectrum is in accord with the structure as is the infrared spectrum of the dihydrochloride salt.

The equation for the reaction is given below:

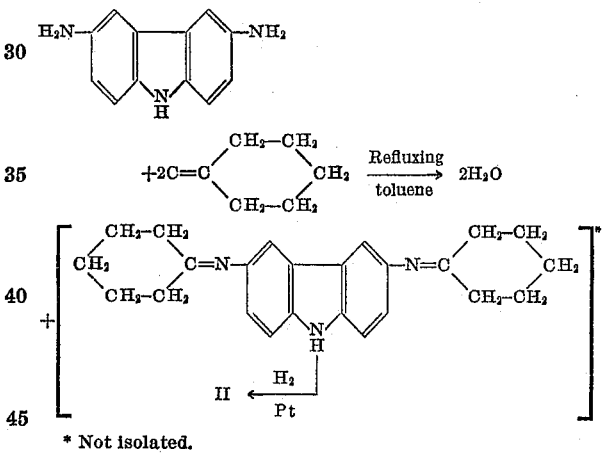

\* Not isolated.

The new carbazole amines, I and II, were tested and found to be excellent anti-oxidants for linseed oil. Solutions containing from .5 to 1.0% of the two amines in linseed oil were prepared and allowed to stand in open crystallizing dishes for 48 hours and compared to linseed oil which was allowed to stand for similar period without an anti-oxidant. Oxidation of linseed oil is accompanied by an increase in weight due to oxygen upstake, and the reduction of this increase in weight is the criterion of a good anti-oxidant. The table below shows the results of this test.

| Compound tested: | Weight gain or loss, mg./4.0 grams of linseed oil |
|---|---|
| (1) Boiled linseed oil, no anti-oxidant added | +163.0 |
| (2) 3-(N-cyclohexylamino)carbazole (I) | − 9.5 |
| (3) 3,6-di-(N-cyclohexylamino)carbazole (II) | − 7.5 |

This test shows that the new carbazole amines, I and II, are excellent anti-oxidants.

It will be apparent that our invention provides new carbazole amines, useful as anti-oxidants, of the structures:

(I) 

(II) 

and a method by which they can easily be made.

Although we have disclosed herein the preferred practice of our invention, we intend to cover as well any change or modification therein which may be made without departing from the spirit and scope of the invention.

We claim:

1. The compound 3-(N-cyclohexylamino)carbazole.
2. The compound 3,6-di-(N-cyclohexylamino)carbazole.
3. A method of making a carbazole amine which comprises refluxing a compound selected from the group consisting of 3-aminocarbazole and 3,6-diaminocarbazole with cyclohexanone in toluene, subjecting the product of the reaction to hydrogenation in the presence of a platinum catalyst and crystallizing and collecting the resulting cyclohexylaminocarbazole.

No references cited.